(12) United States Patent  
MacInnis

(10) Patent No.: US 9,241,169 B2
(45) Date of Patent: Jan. 19, 2016

(54) RASTER TO BLOCK CONVERSION IN A COMPRESSED DOMAIN

(71) Applicant: BROADCOM CORPORATION, Irvine, CA (US)

(72) Inventor: Alexander Garland MacInnis, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 50 days.

(21) Appl. No.: 14/157,471

(22) Filed: Jan. 16, 2014

(65) Prior Publication Data

US 2015/0172683 A1    Jun. 18, 2015

Related U.S. Application Data

(60) Provisional application No. 61/917,302, filed on Dec. 17, 2013.

(51) Int. Cl.
*G06K 9/36* (2006.01)
*H04N 19/40* (2014.01)
*G06T 9/00* (2006.01)
*H04N 19/48* (2014.01)
*H04N 19/61* (2014.01)
*H04N 19/433* (2014.01)
*H04N 19/85* (2014.01)

(Continued)

(52) U.S. Cl.
CPC *H04N 19/40* (2014.11); *G06T 9/00* (2013.01); *H04N 19/433* (2014.11); *H04N 19/48* (2014.11); *H04N 19/61* (2014.11); *H04N 19/85* (2014.11); *G06F 12/0207* (2013.01); *G06F 13/28* (2013.01); *H04N 21/44004* (2013.01)

(58) Field of Classification Search
CPC ....... H04N 19/40; H04N 19/48; H04N 19/61; H04N 19/433; H04N 19/85; H04N 21/44004; G06T 9/00; G06T 1/0007; G06F 12/0207; G06F 13/28

USPC ................... 382/166, 232–233, 238
See application file for complete search history.

(56) References Cited

U.S. PATENT DOCUMENTS 6,028,612 A * 2/2000 Balakrishnan et al. ....... 345/544
6,141,446 A * 10/2000 Boliek et al. .................. 382/233
6,751,257 B1  6/2004 Chen et al.
8,442,107 B2  5/2013 Cho et al.

(Continued)

OTHER PUBLICATIONS

"Data Striping", retrieved from <http://en.wikipedia.org/w/index.php?title=Data_striping&oldid=582532749>, last modified Nov. 20, 2013, 3 pgs.

(Continued)

*Primary Examiner* — Kanjibhai Patel
(74) *Attorney, Agent, or Firm* — McDermott Will & Emery LLP

(57) ABSTRACT

A system for raster to block conversion in a compressed domain may include a raster to block encoder, a raster to block decoder, and a memory partitioned into a number of memory stripes having widths of a number of bits. The raster to block encoder may be configured to receive image information associated with pixels of an image in raster order, compress the image information associated with the pixels of the image to generate compressed bits that correspond to at least one of memory stripes, and write the compressed bits to the at least one of the memory stripes. The raster to block decoder may be configured to read, from at least one of the memory stripes of the memory, a number of the compressed bits that correspond to at least one block, and decode the number of the compressed bits to generate the at least one block.

20 Claims, 8 Drawing Sheets

(51) Int. Cl.
  *G06F 13/28* (2006.01)
  *H04N 21/44* (2011.01)
  *G06F 12/02* (2006.01)

(56) References Cited

U.S. PATENT DOCUMENTS

| | | | | |
|---|---|---|---|---|
| 8,873,619 | B1* | 10/2014 | Hogan | 375/240.01 |
| 9,020,044 | B2* | 4/2015 | Zhang et al. | 375/240.24 |
| 2006/0028697 | A1* | 2/2006 | Sato | 358/486 |
| 2009/0245385 | A1 | 10/2009 | Misuda | |
| 2009/0245663 | A1 | 10/2009 | Nagaoka | |
| 2010/0232497 | A1 | 9/2010 | MacInnis et al. | |
| 2011/0038539 | A1* | 2/2011 | Karsanbhai et al. | 382/166 |
| 2013/0051477 | A1 | 2/2013 | Sasaki | |
| 2014/0269920 | A1* | 9/2014 | Rodriguez et al. | 375/240.16 |

OTHER PUBLICATIONS

"Luma (Video)", retrieved from <http://en.wikipedia.org/w/index.php?title=Luma_(video)&oldid=559916300>, last modified on Jun. 14, 2013, 3 pgs.

Adiono, et al., "New Macroblock Engine Architecture for Video Processing", IAPR Conference on Machine Vision Application, May 16-18, 2005, Tsukuba Science City, Japan, pp. 68-71.

Zhang, et al., "An Efficient Reference Frame Storage Scheme for H.264 HDTV Decoder", IEEE, 2006, pp. 361-364.

"Basics of Video", Figures are from A.M. Tekalp. "Digital Video Processing", Prentice Hall PTR, 1995, 6 pgs.

Kerr, "Chrominance Subsampling in Digital Images", Jan. 19, 2012, Issue 3, pp. 1-15.

"Differential Pulse-Code Modulation" retrieved from <http://en.wikipedia.org/w/index.php?title=Differential_pulse-code_modulation&oldid=564560412>, last modified on Jul. 16, 2013, 2 pgs.

"Chrominance", retrieved from <http://en.wikipedia.org/w/index.php?title=Chrominance&oldid=555813237>, last modified on May 19, 2013, 3 pgs.

"Chroma Subsampling", retrieved from <http://en.wikipedia.org/w/index.php?title=Chroma_subsampling&oldid=577595510>, last modified on Oct. 17, 2013, 9 pgs.

* cited by examiner

RASTER TO BLOCK CONVERSION IN A COMPRESSED DOMAIN

CROSS-REFERENCE TO RELATED APPLICATIONS

The present application claims the benefit of U.S. Provisional Patent Application Ser. No. 61/917,302, entitled "Raster to Block Conversion in a Compressed Domain," filed on Dec. 17, 2013, which is hereby incorporated by reference in its entirety for all purposes.

TECHNICAL FIELD

The present description relates generally to raster to block conversion, and more particularly, but not exclusively, to raster to block conversion in a compressed domain.

BACKGROUND

Video compression engines may utilize memory, such as dynamic random-access memory (DRAM), to facilitate compression processes. DRAM may also be used to facilitate raster to block conversion, e.g. when uncompressed video data is received in raster order and needs to be converted to block order for input to the video compression engine. However, read and write accesses to DRAM may consume a significant amount of DRAM bandwidth, which may be a limited and/or expensive resource in one or more implementations.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations. In one or more instances, structures and components are shown in block diagram form in order to avoid obscuring the concepts of the subject technology.

In the subject system for raster to block conversion in a compressed domain, uncompressed video data is structured in a compression function such that the raster to block conversion can be performed in the compressed domain. For example, video data that is to be stored in DRAM is first compressed, such as by a lightweight encoder that uses a compression algorithm that operates on a per-pixel basis, e.g. rather than a per-block basis. Pixels enter the compression function in raster order, and compressed bits are written to DRAM in raster order. However, the compression and writing are done in a manner such that the compressed bits can be read and decompressed in block order, e.g. by a lightweight decoder, such as a per-pixel decoder. The lightweight decoder may provide the decoded blocks to a component of a video compression engine that operates on blocks of pixels, such as macroblocks of 16×16 pixels each, which may be determined by the compression format or standard to which the compression engine is compressing. Thus, the subject system substantially reduces the DRAM bandwidth required to write/read the video data to/from DRAM, e.g. by compressing the video data before writing it to DRAM, while also performing raster to block conversion in the compressed domain, thereby eliminating the need for a pre-compression or post-compression conversion process.

Figure 1:
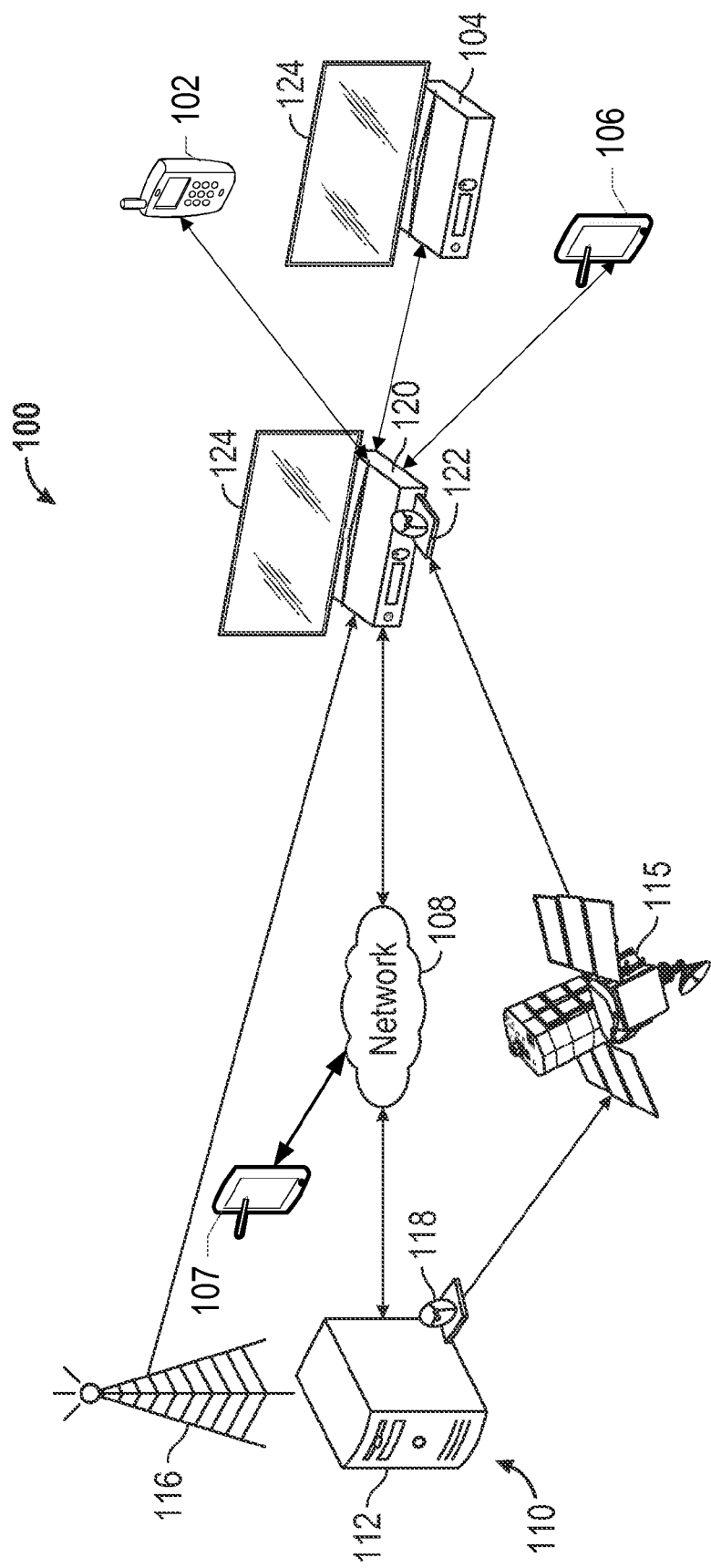
FIG. 1 illustrates an example network environment in which a system for raster to block conversion in a compressed domain can be implemented in accordance with one or more implementations.

FIG. 1 illustrates an example network environment 100 in which a system for raster to block conversion in a compressed domain can be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 100 includes a content delivery network (CDN) 110 that is communicably coupled to a gateway device 120, such as by a network 108. In one or more implementations, the example network environment 100 may further include one or more electronic devices 102, 104, 106 that are communicably coupled to the gateway device 120, such as via a local area network (LAN), and an electronic device 107 that is communicably coupled to the gateway device 120 via the network 108. In one or more implementations, the gateway device 120 may be, or may also include, a set-top box, e.g. a device that is coupled to, and is capable of presenting video content on, an output device 124, such as a television, a monitor, speakers, or any device capable of presenting video content. In one or more implementations, the gateway device 120 may be integrated into the output device 124.

The CDN 110 may include, and/or may be communicably coupled to, a content server 112, an antenna 116 for transmitting AV streams, such as via multiplexed bitstreams, over the air, and a satellite transmitting device 118 that transmits AV streams, such as via multiplexed bitstreams to a satellite 115. The gateway device 120 may include, and/or may be coupled to, a satellite receiving device 122, such as a satellite dish, that receives data streams, such as multiplexed bitstreams, from the satellite 115. In one or more implementations, the gateway device 120 may further include an antenna for receiving data streams, such as multiplexed bitstreams over the air from the antenna 116 of the CDN 110. In one or more implementations, the content server 112 may transmit AV streams to the gateway device 120 over the coaxial transmission network. In one or more implementations, the gateway device 120 may receive internet protocol (IP) distributed AV streams via the network 108 and native moving picture experts group (MPEG) transport streams may be received via one or more of the antenna 116 and the satellite 115. The content server 112 and/or the gateway device 120, may be, or may include, one or more components of the electronic system discussed below with respect to FIG. 8.

The electronic devices 102, 104, 106, 107 can be computing devices such as laptop or desktop computers, smartphones, personal digital assistants (PDAs), portable media players, set-top boxes, tablet computers, televisions or other displays with one or more processors coupled thereto and/or embedded therein, or other appropriate computing devices that can be used for receiving, decoding, and presenting video content and/or can be coupled to such a device. In the example of FIG. 1, the electronic device 102 is depicted as a smart phone, the electronic device 104 is depicted as a set-top box that is coupled to an output device 124, and the electronic devices 106, 107 are depicted as tablet devices. In one or more implementations, any of the electronic devices 102, 104, 106, 107 may be referred to as a user device or a client device. For example, the electronic device 104 and the gateway device 120 may both be, and/or include, set-top boxes and the electronic device 104 may operate as a client device of the gateway device 120.

In the network environment 100 of FIG. 1, the gateway device 120 couples the electronic devices 102, 104, 106 to the content server 112 and/or to the network 108. For example, the gateway device 120 may receive requests for video data, such as video programs, the electronic devices 102, 104, 106 and may forward the requests to the content server 112. In response to the requests, the gateway device 120 may receive the requested video data from the content server 112, may compress, e.g. encode, or transcode the video content, and may forward the compressed video content to one or more of the electronic devices 102, 104, 106, such as via a LAN, and/or to the electronic device 107, such as via the network 108.

In one or more implementations, the gateway device 120 may receive and/or retrieve compressed or uncompressed video data via one or more local AV sources, such as a local hard drive, one or more local AV tuners, one or more local video devices, such as Blu-ray players, and the like. In one or more implementations, the electronic devices 102, 104, 106, 107 may store recorded video content, such as video programs, on the local hard drive of the gateway device 120. The gateway device 120 may decompress and/or compress the video data received/retrieved from local AV sources and may provide the compressed video data to the electronic devices 102, 104, 106, e.g. via network 108, for playback. The gateway device 120 may compress the video data using a video compression engine, such as a block-based video compression engine including, but not limited to, a high efficiency video coding (HEVC) compression engine, an Advanced Video Coding (AVC) compression engine, and the like.

In one or more implementations, the gateway device 120 may utilize memory, such as DRAM, to facilitate the video compression engine. For example, the DRAM may buffer the video data, or a portion thereof, before the video data is processed by the video compression engine. In order to reduce DRAM bandwidth associated with the reading/writing the video data, the gateway device 120 may compress the video data before it is stored in DRAM, e.g. using a pixel-based compression engine (or encoder) rather than a block based compression engine, and may decompress the video data, e.g. using a pixel-based decompression engine (or decoder), when the video data is retrieved from DRAM for processing by the block-based video compression engine. By compressing the video data before it is written to DRAM, and decompressing the video data after it is read from DRAM, the gateway device 120 may significantly reduce the DRAM bandwidth used for writing/reading the video data.

However, the decompressed video data received/retrieved by the gateway device 120 may be organized in raster order. Since the video compression engine operates on blocks, the gateway device 120 may perform a raster to block conversion on the compressed video data. In this regard, the uncompressed video data may be structured by the per-pixel encoder during encoding such that the raster to block conversion can be performed in the compressed domain. Thus, the per-pixel encoder may be referred to as a raster to block encoder. The compression and writing of the pixels in raster order is done in such a manner that the compressed bits can be read and decompressed in block order, such as by the per-pixel decoder. Thus, the per-pixel decoder may be referred to as a raster to block decoder. The per-pixel decoder may provide the decoded blocks to the block-based video compression engine. The block-based video compression engine may operate on blocks of pixels, such as macroblocks of 16×16 pixels each, macroblocks of 64×64 pixels each, or generally macroblocks of any block width and any block height. A device, such as the gateway device 120, implementing the system for raster to block conversion in the compressed domain is discussed further below with respect to FIG. 2.

Figure 2:
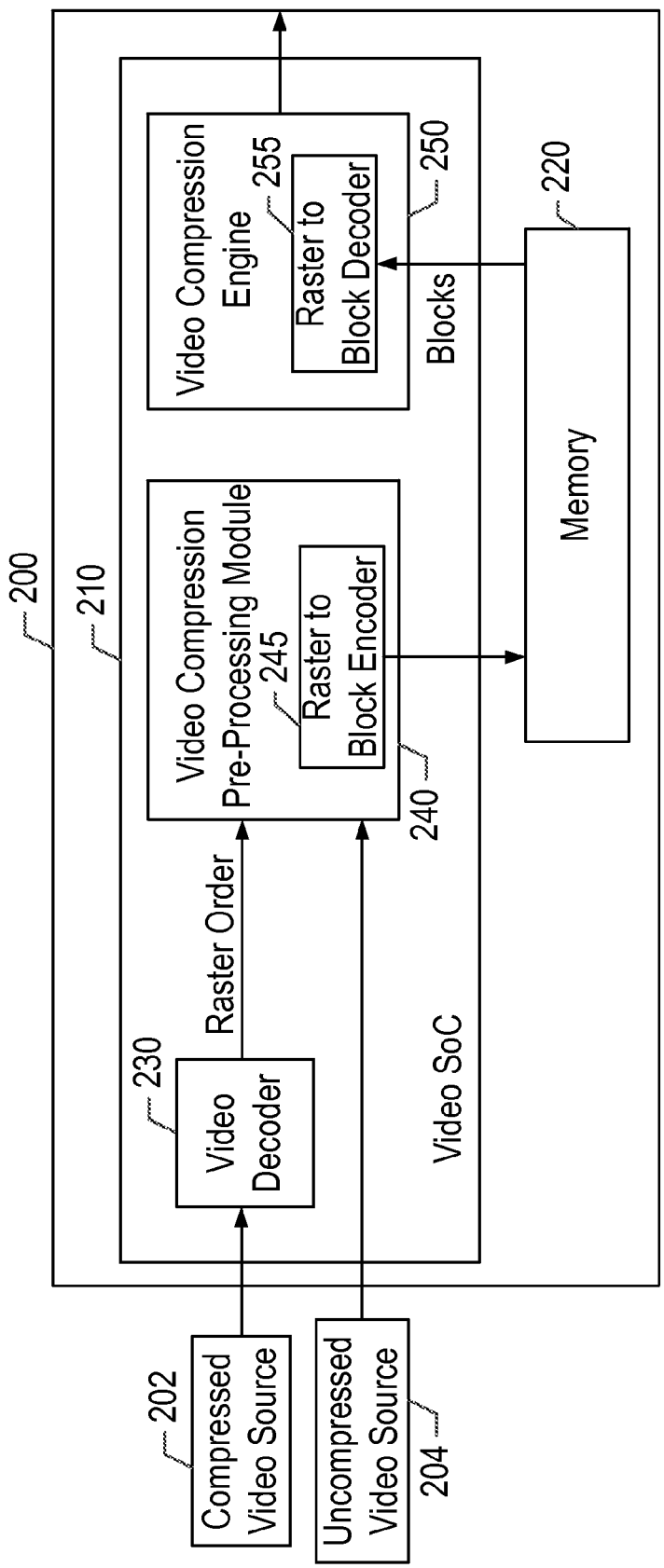
FIG. 2 illustrates an example device implementing a system for raster to block conversion in a compressed domain in accordance with one or more implementations.

FIG. 2 illustrates an example device 200 implementing a system for raster to block conversion in a compressed domain in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided. In one or more implementations, the example device 200 may be, or may include all or part of, the gateway device 120 of FIG. 1; however, the example device 200 is not limited to the gateway device 120 of FIG. 1.

The device 200 may include a video SoC 210, and a memory 220. The device 200 may be communicatively coupled to, and/or may include, a compressed video source 202 and/or an uncompressed video source 204. The video SoC 210 may include a video decoder 230, a video compression pre-processing module 240, and a video compression engine 250. The video compression pre-processing module 240 may include a raster to block encoder 245 and the video compression engine 250 may include a raster to block decoder 255. The memory 220 may be, or may include, one or more DRAM memory modules, or generally any memory modules. An example raster to block conversion process of the device 200 is discussed further below with respect to FIG. 5.

In one or more implementations, the video compression pre-processing module 240 may perform one or more pre-processing operations on the received video data, such as scaling the received video data. In one or more implementations, the video compression pre-processing module 240 may not perform any operations on the received video data and therefore the video compression pre-processing module 240 may effectively be the raster to block encoder 245. The video compression engine 250 may perform block based video compression, such as HEVC, AVC, or generally any video compression that operates on blocks, or groups, of pixels.

In operation, the video compression pre-processing module 240 receives uncompressed video data in raster order from the uncompressed video source 204, such as a Blu-ray player, and/or from the video decoder 230. For example, the video decoder 230 may decode, or decompress, video data received from a compressed video source 202, such as an MPEG transport stream received from the CDN 110.

The raster to block encoder 245 encodes, or compresses, pixels of images of the video data, and/or image information associated therewith, in raster order to generate compressed bits, and the raster to block encoder 245 writes the compressed bits to the memory 220 in raster order. The compressed bits are structured in the memory 220 by the raster to block encoder 245 such that the raster to block decoder 255 can read a number of the compressed bits from the memory 220 that correspond to at least one block, e.g. in a single memory access. In one or more implementations, the image information associated with the pixels may include one or more of luma values, chroma values, or generally any image information. In one or more implementations, the raster to block encoder 245 may utilize one or more buffers to facilitate generating the compressed bits and/or writing the compressed bits to the memory 220. An example raster to block encoder 245 that utilizes one or more buffers is discussed further below with respect to FIG. 3.

The raster to block decoder 255 reads a number of the compressed bits from the memory 220 that correspond to at least one block. The raster to block decoder 255 decodes the at least one block and provides the at least one block to a component of the video compression engine 250, such as a motion estimation module of the video compression engine 250. The video compression engine 250 may then perform block-based video compression on the received blocks. In one or more implementations, the raster to block decoder 255 may utilize one or more buffers to facilitate reading the compressed bits from the memory 220 and generating the blocks. An example raster to block decoder 255 that utilizes one or more buffers is discussed further below with respect to FIG. 4.

In one or more implementations, the video decoder 230, the video compression pre-processing module 240, the raster to block encoder 245, the video compression engine 250, and/or the raster to block decoder 255, can be implemented in software (e.g., subroutines and code). In one or more implementations, the video decoder 230, the video compression pre-processing module 240, the raster to block encoder 245, the video compression engine 250, and/or the raster to block decoder 255, can be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
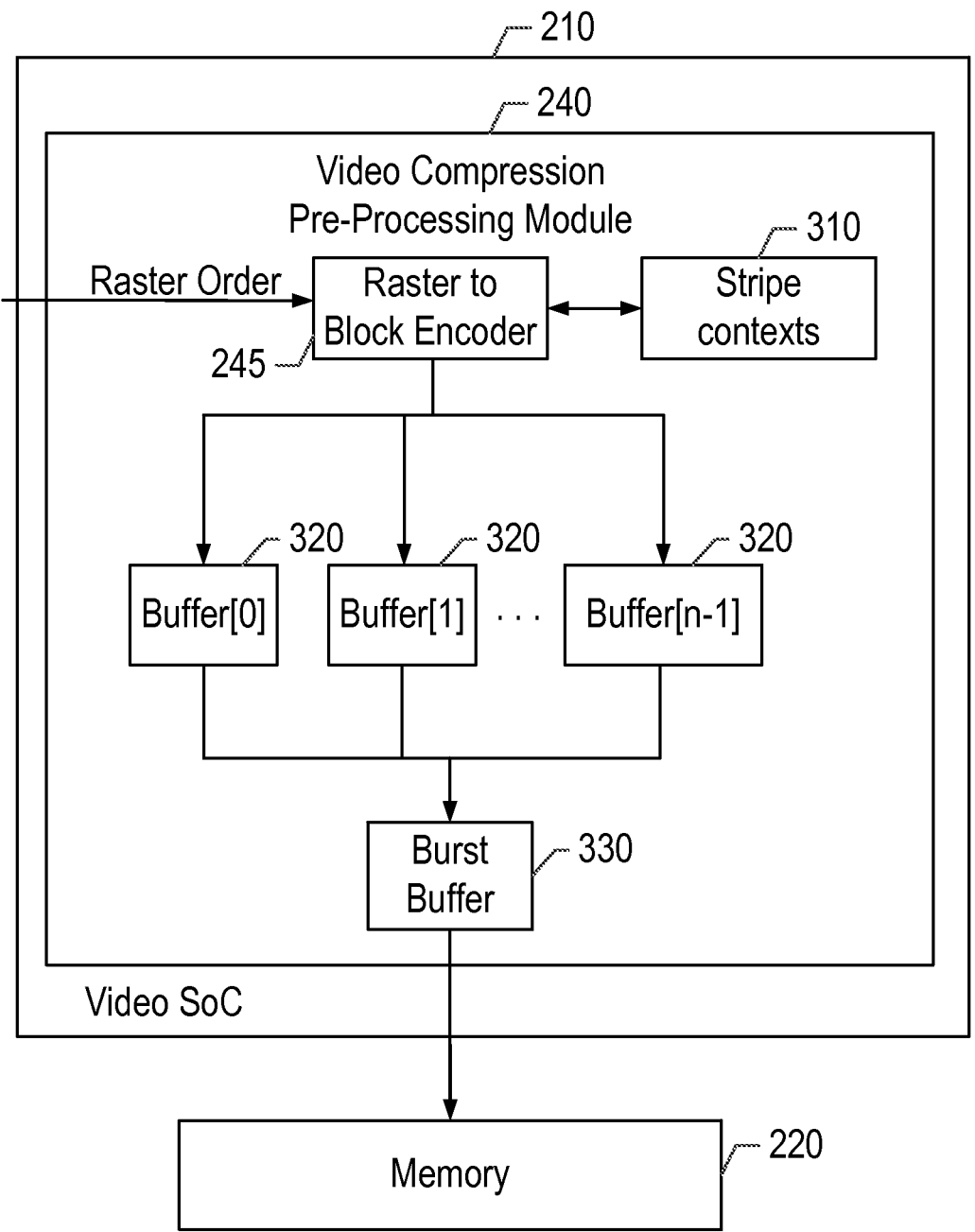
FIG. 3 illustrates an example video system on a chip (SoC) implementing a raster to block encoder of a system for raster to block conversion in a compressed domain in accordance with one or more implementations.

FIG. 3 illustrates an example video SoC 210 implementing an example raster to block encoder 245 of a system for raster to block conversion in a compressed domain in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The video SoC 210 includes a video compression pre-processing module 240 and the video SoC 210 is communicatively coupled to the memory 220. The video compression pre-processing module 240 includes the raster to block encoder 245, a stripe contexts buffer 310, one or more buffers 320, and a burst buffer 330. In one or more implementations, one or more of the buffers 320 and/or the burst buffer 330 may be external to the video compression pre-processing module 240.

In one or more implementations, the raster to block encoder 245 may logically divide an image to be encoded into a number of pixel stripes. In one or more implementations, the width of the pixel stripes may be equal to, or different than, the width of the block size that is read by the video compression engine 250, such as 16 pixel-wide macroblocks for AVC, or 64 pixel-wide coding tree units (CTUs) for HEVC. Thus, for an image width of 1920 pixels, and a pixel stripe width of 16 pixels, there may be 120 pixel stripes per image; for an image width of 1920 pixels, and a pixel stripe width of 64 pixels, there may be 30 pixel stripes per image. Similarly, for an image height of 1080 pixels, the pixel stripes may have 1080 rows, or lines; however, the pixel stripes may include any number of rows or lines, e.g. a number of rows or lines that is less than, or greater than, the image height in pixels. An example image divided into example pixel stripes is discussed further below with respect to FIG. 6.

In one or more implementations, the raster to block encoder 245 may allocate separate buffers 320, such as on-chip buffers, for each of the respective pixel stripes. The buffers 320 may be, may include, and/or may be used as, encoder rate buffers and/or temporary storage buffers. The buffers 320 may be used as rate buffers by the raster to block encoder 245 to smooth out the variation in bits per individual pixel to match a constant rate of compressed video. The buffers 320 for a number of pixel stripes may be logical partitions of one or more physical buffers.

The raster to block encoder 245 codes image information associated with the pixels of the pixel stripes, such as samples, in picture raster order, e.g. the first line of the first pixel stripe, the first line of the second pixel stripe, etc., up to and including the first line of the last pixel stripe, and then the second line of the first pixel stripe, the second line of the second pixel stripe, etc. In one or more implementations, the compressed bits for each stripe may be stored in the buffer 320 allocated for each (respective) stripe. Thus, the raster to block encoder 245 changes context each stripe, and saves and restores the context of each stripe using the stripe contexts buffer 310. The raster to block encoder 245 moves compressed bits from the buffers 320 to the burst buffer 330 and writes efficiently sized bursts from the burst buffer 330 to the memory 220, such as 512 byte bursts. A burst may include a number of smaller chunks of data from multiple consecutive stripes, e.g. in stripe order, that are accumulated in the burst buffer 330 such as 8 bytes per stripe across 64 stripes for 16 pixel-wide stripes, or 32 bytes per stripe across 16 stripes for 64 pixel-wide stripes. Selecting 8 bytes or 32 bytes from multiple stripes to form a single burst may enable significant savings of on-chip memory, e.g. compared to 120 burst buffers (one per stripe) of 1024 bytes each, and it may enable efficient access to the memory 220. Thus, the raster to block encoder 245 writes the compressed bits to the memory 220 using raster order writes.

In one or more implementations, the memory 220, such as DRAM, may be logically partitioned into one or more memory stripes that correspond to the image. For example, the pixels of the image, and/or blocks of pixels, may be mapped to the memory stripes such that the compressed bits generated for the pixels are stored in the memory stripe that is mapped to the pixels. An example mapping of the memory 220 is discussed further below with respect to FIG. 7. In one or more implementations, the one or more memory stripes may be any data structure and/or data arrangement that can provide for a multi-dimensional addressing system, such as a multi-dimensional array. In this manner, a region of memory addresses can be accessed such that vertically adjacent compressed bits, e.g. corresponding to at least one block, can be read from the memory 220 in a single memory access.

The memory stripes may each have a width of a number of bits and may include a number of lines, or rows, which can be sequentially accessed within a memory stripe. For example, a number of sequential rows of a memory stripe may be read using a single memory access. In one or more implementations, the number of lines or rows of each memory stripe may correspond to the pixel-height of the image. Thus, if the pixel-height of the image is 1080 pixels, the memory stripes may include 1080 rows. In one or more implementations, the number of rows of the memory stripes may be independent of the pixel height of the image. In one or more implementations, the memory stripes may be associated with the pixel stripes and/or the buffers 320 associated therewith, e.g. each memory stripe may be associated with one of the pixel stripes and/or the buffer 320 associated therewith, or the memory stripes may be independent of the pixel stripes and/or the buffers 320 associated therewith. In one or more implementations, the raster to block encoder 245 may utilize memory stripes without utilizing pixel stripes, or vice-versa.

Figure 4:
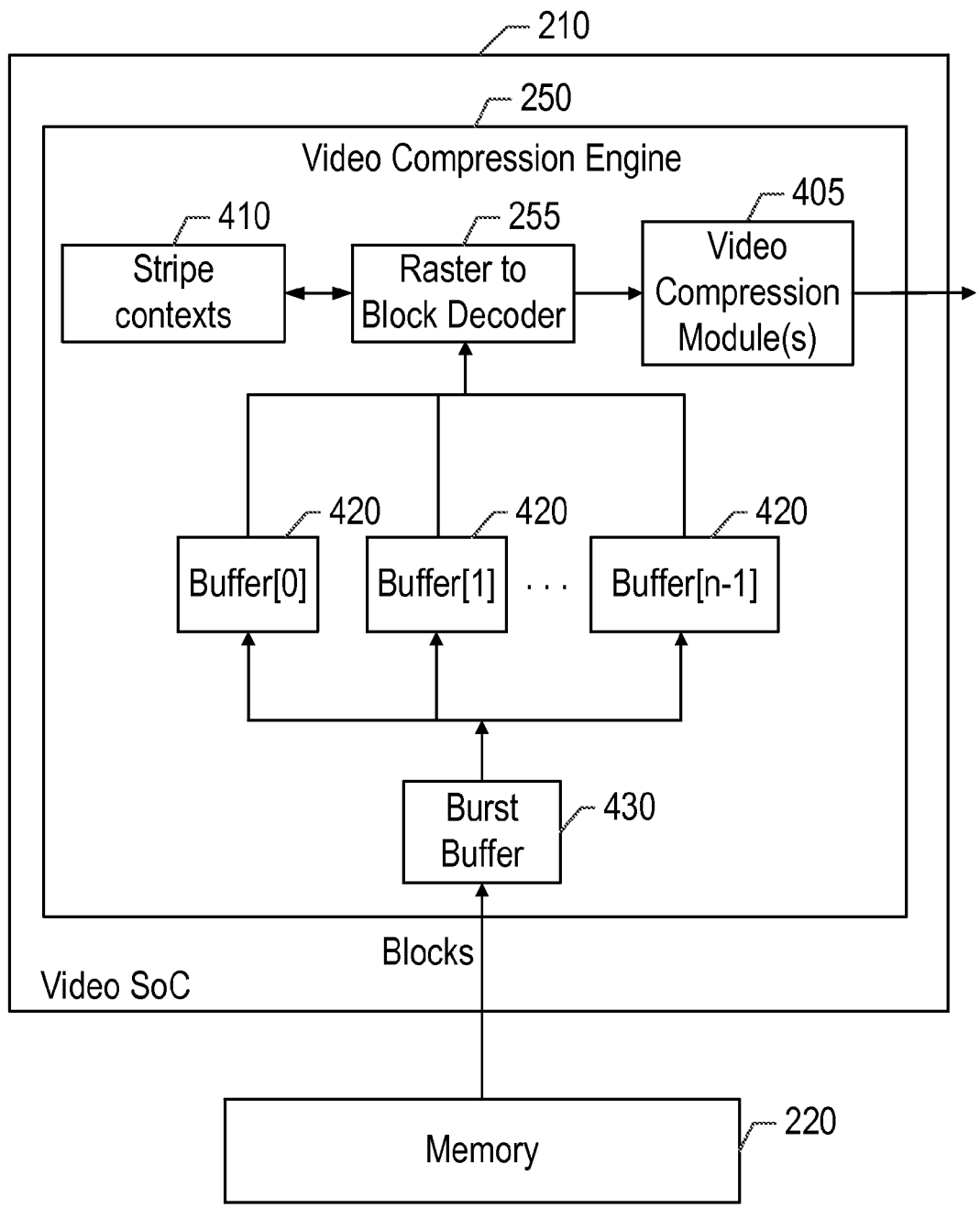
FIG. 4 illustrates example video SoC implementing a raster to block decoder of a system for raster to block conversion in a compressed domain in accordance with one or more implementations.

FIG. 4 illustrates example video SoC 210 implementing an example raster to block decoder 255 of a system for raster to block conversion in a compressed domain in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The video SoC 210 includes a video compression engine 250 and the video SoC 210 is communicatively coupled to the memory 220. The video compression engine 250 includes the raster to block decoder 255, one or more video compression modules 405, a stripe contexts buffer 410, one or more buffers 420, and a burst buffer 430. In one or more implementations, one or more of the buffers 420 and/or the burst buffer 430 may be external to the video compression engine 250.

The raster to block decoder 255 may allocate separate buffers 420, such as on-chip buffers, for each of the respective memory stripes. The buffers 420 may be, may include, and/or may be used as, decoder rate buffers and/or temporary storage buffers. The buffers 420 for a number of memory stripes may be logical partitions of one or more physical buffers. The raster to block decoder 255 may read a number of compressed bits that correspond to at least one block from at least one memory stripe and may temporarily store the compressed bits in the burst buffer 430. The compressed bits may be subsequently moved from the burst buffer 430 to the one of the buffers 420 that corresponds to the at least one memory stripe from which the compressed bits were read. Thus, the raster to block decoder 255 changes context each memory stripe, and saves and restores the context of each memory stripe using the stripe contexts buffer 410. The raster to block decoder 255 may decode a number of the compressed bits read from one or more of the memory stripes to generate at least one block, such as based on the memory mapping used by the raster to block encoder 245 to write the compressed bits to the memory stripes of the memory 220. The at least one block may be provided to the one or more video compression modules 405 of the video compression engine 250.

Figure 5:
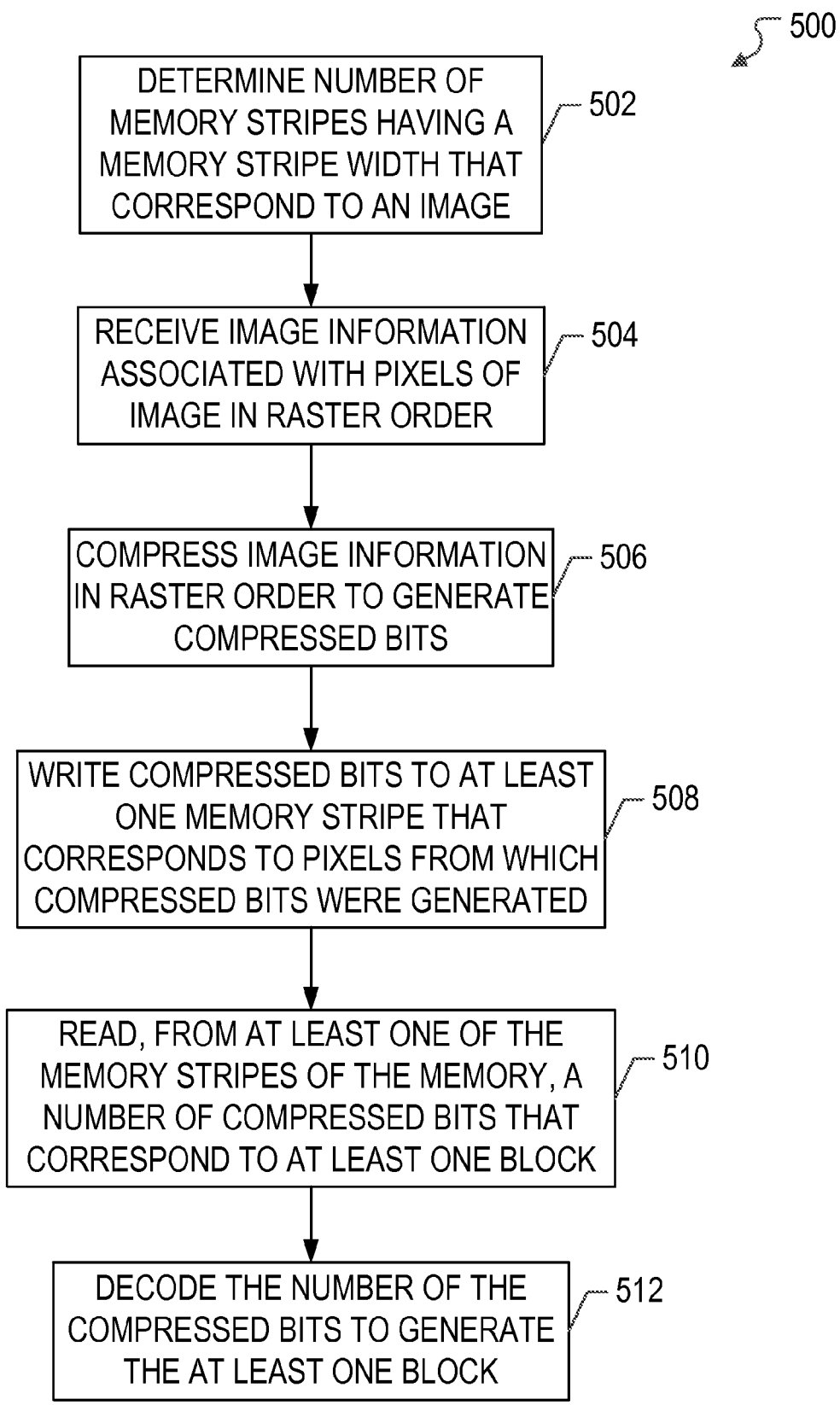
FIG. 5 illustrates a flow diagram of an example raster to block conversion process of a system for raster to block conversion in a compressed domain in accordance with one or more implementations.

FIG. 5 illustrates a flow diagram of an example raster to block conversion process 500 of a system for raster to block conversion in a compressed domain in accordance with one or more implementations. For explanatory purposes, the example raster to block conversion process 500 is primarily described herein with reference to the video SoC 210 of the device 200 of FIG. 2; however, the example raster to block conversion process 500 is not limited to the video SoC 210 of the device 200 of FIG. 2, and the example raster to block conversion process 500 can be performed by one or more other components of the device 200. Further for explanatory purposes, the blocks of the example raster to block conversion process 500 are described herein as occurring in serial, or linearly. However, multiple blocks of the example raster to block conversion process 500 can occur in parallel. In addition, the blocks of the example raster to block conversion process 500 can be performed a different order than the order shown and/or one or more of the blocks of the example raster to block conversion process 500 are not performed.

The video SoC 210 determines a number of memory stripes to be used in the memory 220 for an image, where the memory stripes each have a memory stripe width of a number of bits (502). The memory stripes may correspond to portions of the image, such as pixel stripes of the image, pixels of the image, blocks of pixels of the image, or any portions of the image. For example, the video SoC 210 may use a memory map of the image to identify the portions of the image that correspond to the memory stripes. In one or more implementations, the video SoC 210 may partition the memory 220 and/or generate data structures in the memory 220 for the memory stripes. The raster to block encoder 245 of the video SoC 210 receives image information associated with pixels of an image in raster order (504). For example, the raster to block encoder 245 may receive luma values and/or chroma values associated with pixels of an image in raster order. The raster to block encoder 245 compresses the image information associated with the pixels in raster order to generate compressed bits that correspond to at least one of the memory stripes of the memory 220 (506). For example, raster to block encoder 245 may compress the luma and/or chroma values associated with the pixels, or the raster to block encoder 245 may perform any other compression of any image information associated with the pixels.

The raster to block encoder 245 writes the compressed bits to the at least one memory stripe of the memory 220 that corresponds to the pixels from which the compressed bits were generated (508), such as based on the memory map used for the image. In one or more implementations, the raster to block encoder 245 may write the compressed bits to the at least one memory stripe using efficient burst sizes, such as to reduce the number of accesses to the memory 220. For example, the raster to block encoder 245 may aggregate compressed bits corresponding to the at least one memory stripe in the burst buffer 330 and may write the aggregated compressed bits to the at least one memory stripe of the memory 220, e.g. in a single burst.

The raster to block decoder 255 of the video SoC 210 reads, from at least one of the memory stripes of the memory 220, the compressed bits that correspond to at least one block, e.g.

based at least on the block size used by the video compression engine 250 (510). In one or more implementations, the raster to block decoder 255 may utilize the memory map to identify the locations in the memory 220 of the compressed bits that correspond to the at least one block, e.g. the compressed bits may be stored in the memory 220 across multiple rows of at least one memory stripe. The raster to block decoder 255 decodes the compressed bits that correspond to the at least one block (512). The raster to block decoder 255 may then provide the decoded at least one block to a component of the video compression engine 250, such as a motion estimation module.

Figure 6:
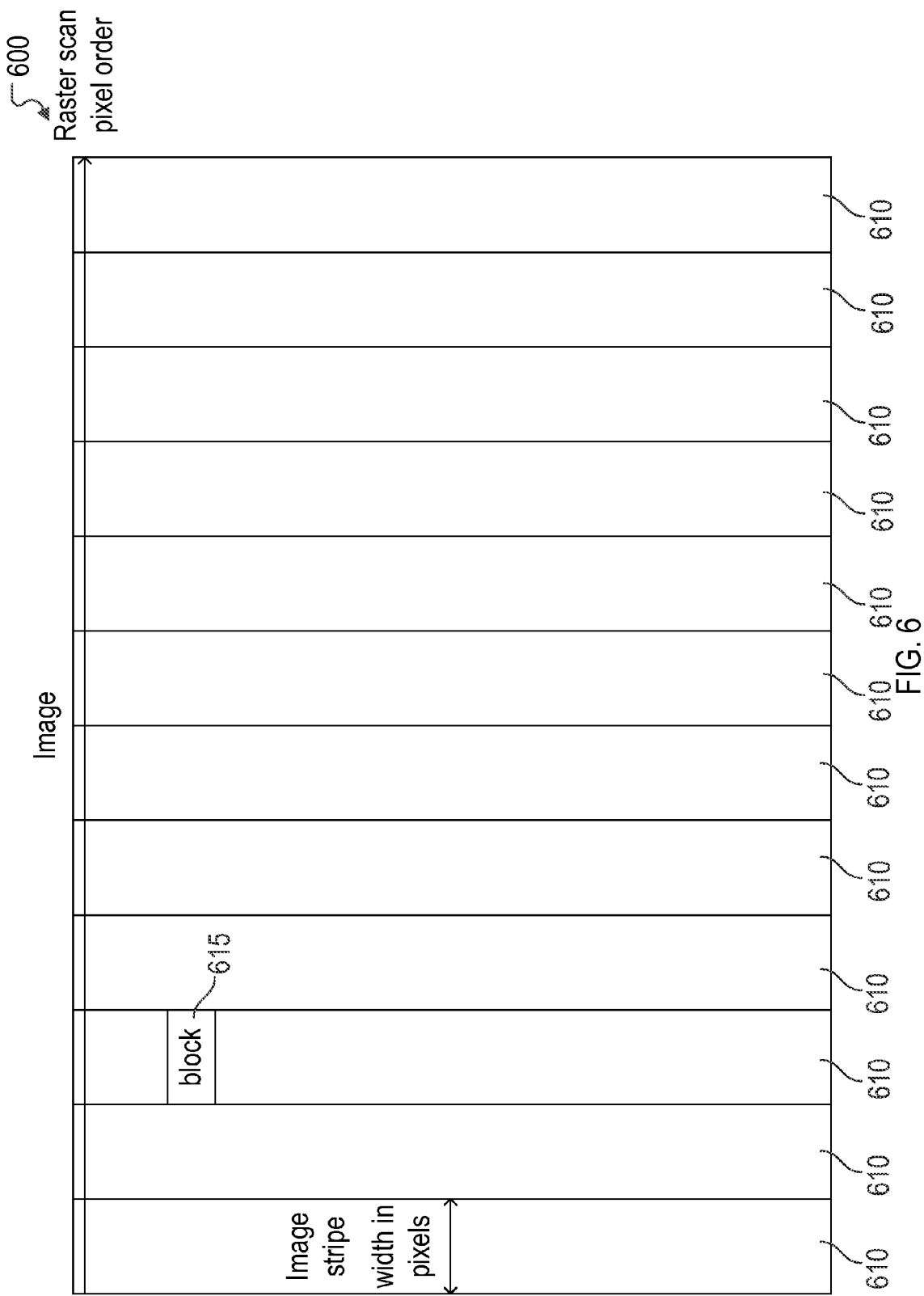
FIG. 6 illustrates example image divided into pixel stripes in a system for raster to block conversion in a compressed domain in accordance with one or more implementations.

FIG. 6 illustrates example image 600 divided into pixel stripes 610 in a system for raster to block conversion in a compressed domain in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example image 600 is logically divided into a number of pixel stripes 610, e.g. by the raster to block encoder 245 and/or the video SoC 210. The example image 600 may be divided into any number of pixel stripes 610, such as two or more pixel stripes 610. In one or more implementations, the pixel stripes 610 may each have a width in a number of pixels that is equal to the width of the blocks used by the video compression engine 250, less than the width of the blocks used by the video compression engine 250, and/or more than the width of the blocks used by the video compression engine 250. Thus, in one or more implementations the pixel stripes 610 may include a number of vertically adjacent blocks 615. In one or more implementations, the pixel stripes 610 may each be associated with one of the buffers 320. As shown in FIG. 6, the raster to block encoder 245 may process the pixels from the pixel stripes 610 in raster scan order.

Figure 7:
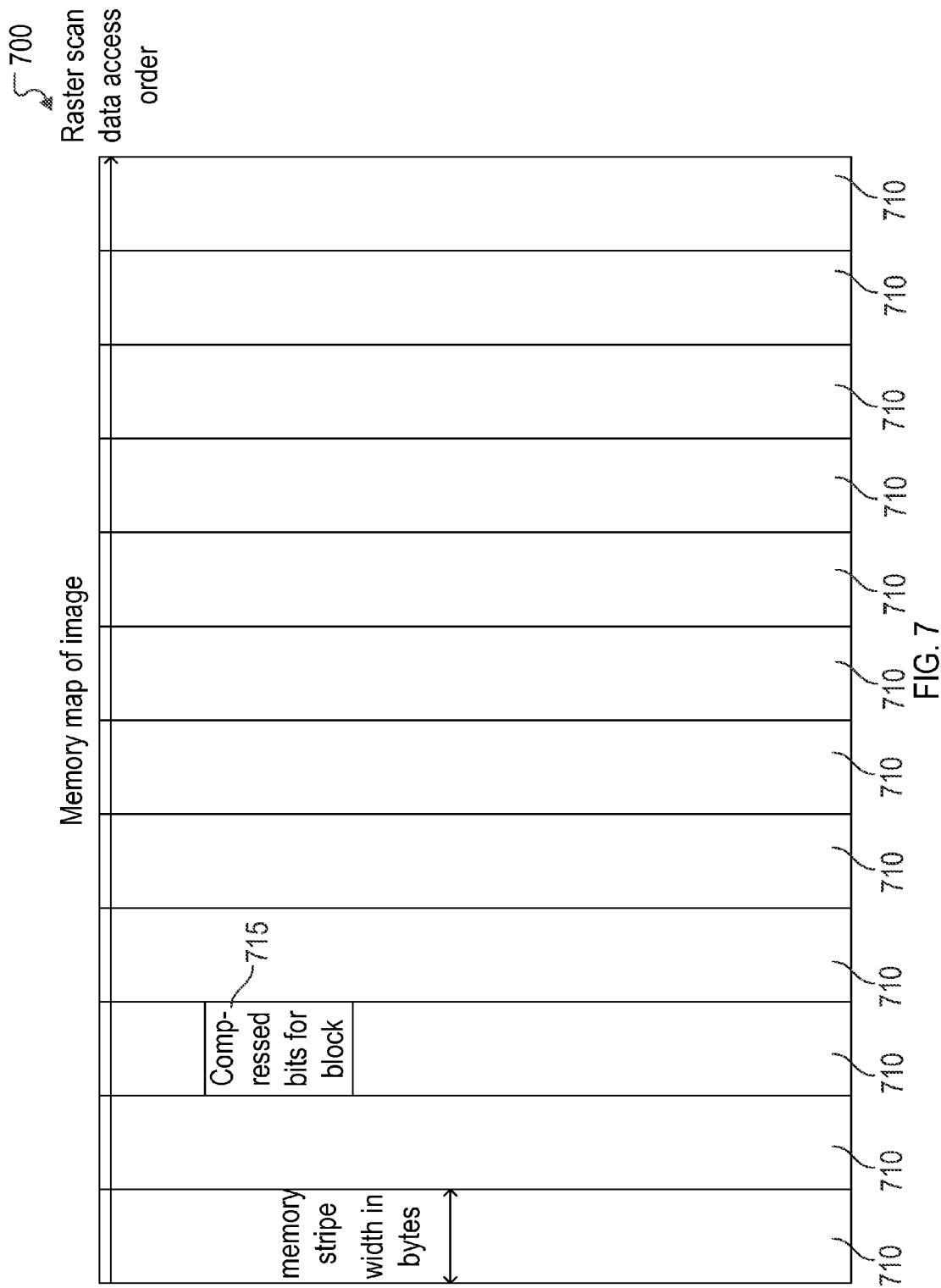
FIG. 7 illustrates an example memory mapping in a system for raster to block conversion in a compressed domain in accordance with one or more implementations.

FIG. 7 illustrates an example memory mapping 700 in a system for raster to block conversion in a compressed domain in accordance with one or more implementations. Not all of the depicted components can be used, however, and one or more implementations can include additional components not shown in the figure. Variations in the arrangement and type of the components can be made without departing from the spirit or scope of the claims as set forth herein. Additional components, different components, or fewer components can be provided.

The example memory mapping 700 includes a number of memory stripes 710. The example memory mapping 700 may include any number of memory stripes 710, such as two or more memory stripes 710. In one or more implementations, the memory stripes 710 may have a width in a number of bytes (or bits). In one or more implementations, the memory stripes 710 may correspond to portions of the example image 600, such as the pixel stripes 610 of the example image 600, or any other portions of the example image 600. In one or more implementations, the memory stripes 710 may store compressed bits that correspond to at least one block of pixels having a block size used by the video compression engine 250, or that correspond to less than one block of pixels having the block size used by the video compression engine 250. Thus, in one or more implementations the memory stripes 710 may include a number of compressed bits 715 that correspond to vertically adjacent blocks of pixels.

Figure 8:
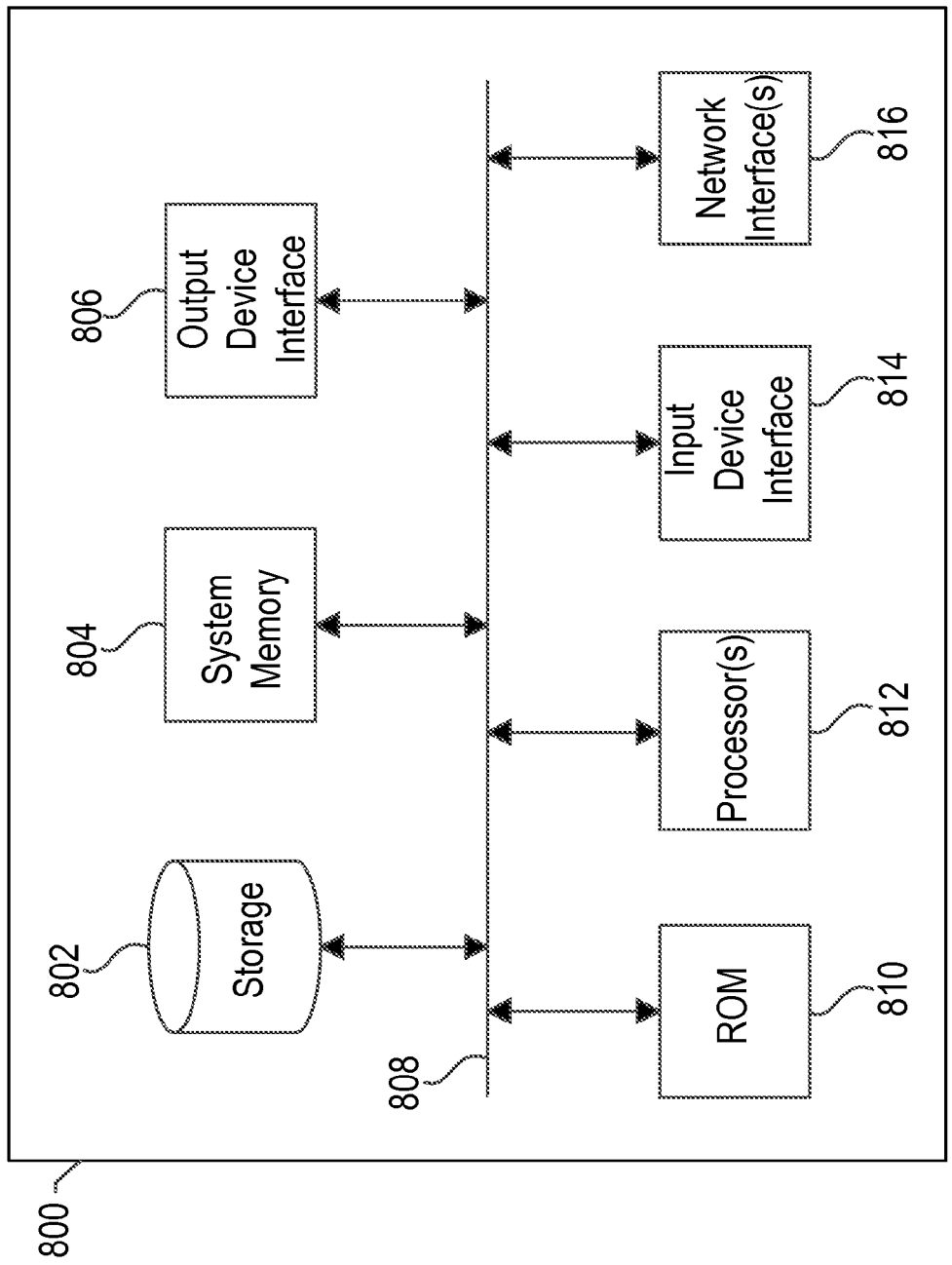
FIG. 8 conceptually illustrates an electronic system with which one or more implementations of the subject technology can be implemented.

FIG. 8 conceptually illustrates an electronic system 800 with which one or more implementations of the subject technology can be implemented. The electronic system 800, for example, can be a gateway device, a set-top box, a desktop computer, a laptop computer, a tablet computer, a server, a switch, a router, a base station, a receiver, a phone, or generally any electronic device that transmits signals over a network. The electronic system 800 can be, and/or can be a part of, the gateway device 120 and/or the device 200. Such an electronic system includes various types of computer readable media and interfaces for various other types of computer readable media. The electronic system 800 includes a bus 808, one or more processor(s) 812, a system memory 804 or buffer, a read-only memory (ROM) 810, a permanent storage device 802, an input device interface 814, an output device interface 806, and one or more network interface(s) 816, or subsets and variations thereof.

The bus 808 collectively represents all system, peripheral, and chipset buses that communicatively connect the numerous internal devices of the electronic system 800. In one or more implementations, the bus 808 communicatively connects the one or more processor(s) 812 with the ROM 810, the system memory 804, and the permanent storage device 802. From these various memory units, the one or more processor(s) 812 retrieve instructions to execute and data to process in order to execute the processes of the subject disclosure. The one or more processor(s) 812 can be a single processor or a multi-core processor in different implementations.

The ROM 810 stores static data and instructions that are used by the one or more processor(s) 812 and other modules of the electronic system 800. The permanent storage device 802, on the other hand, can be a read-and-write memory device. The permanent storage device 802 can be a non-volatile memory unit that stores instructions and data even when the electronic system 800 is off. In one or more implementations, a mass-storage device (such as a magnetic or optical disk and its corresponding disk drive) can be used as the permanent storage device 802.

In one or more implementations, a removable storage device (such as a floppy disk, flash drive, and its corresponding disk drive) can be used as the permanent storage device 802. Like the permanent storage device 802, the system memory 804 can be a read-and-write memory device. However, unlike the permanent storage device 802, the system memory 804 can be a volatile read-and-write memory, such as random access memory. The system memory 804 can store any of the instructions and data that one or more processor(s) 812 can use at runtime. In one or more implementations, the processes of the subject disclosure are stored in the system memory 804, the permanent storage device 802, and/or the ROM 810. From these various memory units, the one or more processor(s) 812 retrieve instructions to execute and data to process in order to execute the processes of one or more implementations.

The bus 808 also connects to the input and output device interfaces 814 and 806. The input device interface 814 enables a user to communicate information and select commands to the electronic system 800. Input devices that can be used with the input device interface 814 can include, for example, alphanumeric keyboards and pointing devices (also called "cursor control devices"). The output device interface 806 can enable, for example, the display of images generated by electronic system 800. Output devices that can be used with the output device interface 806 can include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations can include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 8, bus 808 also couples electronic system 800 to one or more networks (not shown) through one or more network interface(s) 816. One or more network interface(s) can include an Ethernet interface, a WiFi interface, a multimedia over coax alliance (MoCA) interface, a reduced gigabit media independent interface (RGMII), or generally any interface for connecting to a network. In this manner, electronic system 800 can be a part of one or more networks of computers (such as a local area network (LAN), a wide area network (WAN), or an Intranet, or a network of networks, such as the Internet. Any or all components of electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes can be rearranged, or that all illustrated blocks be performed. Any of the blocks can be performed simultaneously. In one or more implementations, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component can also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect can apply to all configurations, or one or more configurations. An aspect can provide one or more examples of the disclosure. A phrase such as an "aspect" can refer to one or more aspects and vice versa. A phrase such as an "embodiment" does not imply that such embodiment is essential to the subject technology or that such embodiment applies to all configurations of the subject technology. A disclosure relating to an embodiment can apply to all embodiments, or one or more embodiments. An embodiment can provide one or more examples of the disclosure. A phrase such an "embodiment" can refer to one or more embodiments and vice versa. A phrase such as a "configuration" does not imply that such configuration is essential to the subject technology or that such configuration applies to all configurations of the subject technology. A disclosure relating to a configuration can apply to all configurations, or one or more configurations. A configuration can provide one or more examples of the disclosure. A phrase such as a "configuration" can refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for raster to block conversion in a compressed domain, the method comprising:
   determining a number of memory stripes of a memory that correspond to an image based at least on a size of the image, the memory stripes having memory stripe widths of a number of bits;
   receiving image information associated with pixels of the image in raster order;
   compressing the image information associated with the pixels of the image in the raster order to generate compressed bits;
   writing the compressed bits to at least one of the memory stripes that corresponds to the pixels from which the compressed bits were generated;
   reading, from the at least one of the memory stripes of the memory, a number of the compressed bits that correspond to at least one block; and
   decoding the number of the compressed bits to generate the at least one block.

2. The method of claim 1, further comprising:
   providing the at least one block to a component of a video compression engine.

3. The method of claim 1, wherein the block has a block width of a first number of pixels and a block height of a second number of pixels.

4. The method of claim 1, wherein the at least one memory stripe of the memory stripes comprises an array in the memory that is accessible sequentially within the at least one memory stripe and wherein reading, from the at least one of the memory stripes of the memory, a number of the compressed bits that correspond to at least one block comprises:
   reading sequentially, from the at least one of the memory stripes of the memory, the number of the compressed bits that correspond to the at least one block.

5. The method of claim 1, further comprising:
   determining a number of pixel stripes that correspond to the image based at least on the size of the image, the pixel stripes having pixel stripe widths of a number of pixels.

6. The method of claim 5, further comprising:
   allocating an encoder buffer to at least one of the pixel stripes; and
   storing the compressed bits generated from pixels of at least one of the pixel stripes in the encoder buffer allocated for the at least one of the pixel stripes.

7. The method of claim 6, wherein writing the compressed bits to the at least one of the memory stripes of the memory further comprises:
   writing the compressed bits from the encoder buffer allocated for the at least one of the pixel stripes to the at least one of the memory stripes of the memory.

8. The method of claim 7, further comprising:
   allocating a decoder buffer to at least one of the memory stripes; and
   storing, in the decoder buffer allocated to the at least one of the memory stripes, the number of the compressed bits read from the at least one of the memory stripes.

9. The method of claim 8, wherein the decoding the number of the compressed bits to generate the at least one block comprises:
   decoding the number of the compressed bits stored in the decoder buffer to generate the at least one block.

10. The method of claim 1, wherein the at least one of the memory stripes comprises a data structure that contains a number of sequential rows having the memory stripe width.

11. The method of claim 10, further comprising:
    writing the compressed bits to the sequential rows of the at least one of the memory stripes of the memory; and
    reading, from a number of the sequential rows of the at least one of the memory stripes of the memory, the number of the compressed bits that correspond to the at least one block in a single burst.

12. A device comprising:
    a memory that is partitioned into a number of memory stripes having widths of a number of bits;
    a raster to block encoder that is configured to:
      receive image information associated with pixels of an image in raster order;

compress the image information associated with the pixels of the image in the raster order to generate compressed bits that correspond to at least one of memory stripes of the memory; and write the compressed bits to the at least one of the memory stripes of the memory;

a raster to block decoder that is configured to:

read, from the at least one of the memory stripes of the memory, a number of the compressed bits that correspond to at least one block; and decode the number of the compressed bits to generate the at least one block.

13. The device of claim 12, wherein the memory comprises dynamic random-access memory.

14. The device of claim 12, wherein the raster to block decoder is configured to provide the at least one block to a video compression engine.

15. The device of claim 12, wherein the at least one of the memory stripes comprises an array in the memory that is accessible sequentially within the at least one memory stripes, the array comprising a number of sequential rows having the width of the number of bits.

16. The device of claim 15, wherein:

the raster to block encoder is configured to write the compressed bits to the sequential rows of the at least one of the memory stripes of the memory; and the raster to block decoder is configured to read, from a number of the sequential rows of the at least one of the memory stripes of the memory, the number of the compressed bits that correspond to the at least one block in a single burst.

17. The device of claim 12, wherein the image information associated with the pixels of the image comprises luma values associated with the pixels of the image.

18. A computer program product comprising instructions stored in at least one tangible non-transitory computer-readable storage medium, the instructions comprising:

instructions for receiving pixels of an image in raster order;

instructions for compressing the pixels of the image in the raster order to generate compressed bits that correspond to at least one of a number of memory stripes in a memory, the at least one of the memory stripes having a width of a number of bits;

instructions for writing the compressed bits to the at least one of the memory stripes of the memory;

instructions for reading, from the at least one of the memory stripes of the memory, a number of the compressed bits that correspond to at least one block; and instructions for decoding the number of the compressed bits to generate the at least one block.

19. The computer program product of claim 18, wherein the instructions further comprise:

instructions for determining the number of memory stripes based at least on a size of the image.

20. The computer program product of claim 18, wherein the instructions further comprise instructions for providing the at least one block to a video compression engine.

* * * * *